United States Patent [19]

Anderson

[11] Patent Number: 4,619,833
[45] Date of Patent: Oct. 28, 1986

[54] PROCESS FOR PRODUCING A RAPIDLY WATER-SOLUBLE, FREE-FLOWING, SUGAR-FREE DRY BEVERAGE MIX

[75] Inventor: Del M. Anderson, Port Hope, Canada

[73] Assignee: General Foods Inc., Coubourg, Canada

[21] Appl. No.: 804,702

[22] Filed: Dec. 3, 1985

Related U.S. Application Data

[63] Continuation of Ser. No. 681,401, Dec. 13, 1984, abandoned.

[51] Int. Cl.$^4$ .......................... A23L 1/236; A23L 2/00
[52] U.S. Cl. ...................................... 426/548; 426/590
[58] Field of Search ................. 426/548, 590, 599, 285

[56] References Cited

U.S. PATENT DOCUMENTS

| | | | |
|---|---|---|---|
| 3,011,897 | 12/1961 | Grosvenor | 426/285 |
| 3,016,299 | 1/1962 | Raffensperger et al. | 426/285 |
| 4,497,835 | 2/1985 | Winston | 426/590 |
| 4,554,167 | 11/1985 | Sorge et al. | 426/285 |

OTHER PUBLICATIONS

Gardner, 1966, Food Acidulants Allied Chemical Corporation, New York, pp. 115–117.
Bennett, 1982, Encyclopedia of Chemical Trademarks and Synonyms, vol. II, Chemical Publishers Co. Inc., NY, pp. 158 & 310.
Maltrin Grain Processing Corp., Muscatine, Iowa, (product bulletin).

Primary Examiner—Raymond N. Jones
Assistant Examiner—Carolyn Paden
Attorney, Agent, or Firm—Linn I. Grim; Thomas A. Marcoux; Daniel J. Donovan

[57] ABSTRACT

An improved process for producing a rapidly water-soluble, free-flowing, substantially sugar-free dry beverage mix is provided by initially physically dry mixing coarse particles of food acids with finely divided particles of flavors and flow conditioners to provide a uniform dispersion, then intimately mixing a high potency artificial sweetener and an agglomerated malto-dextrin until a rapidly water-soluble beverage mix is obtained.

15 Claims, No Drawings

PROCESS FOR PRODUCING A RAPIDLY WATER-SOLUBLE, FREE-FLOWING, SUGAR-FREE DRY BEVERAGE MIX

This is a continuation, of application Ser. No. 681,401, filed Dec. 13, 1984, now abandoned.

BACKGROUND OF THE INVENTION

The present invention relates to an improved process for producing a rapidly water-soluble, free-flowing, substantially sugar-free dry beverage mix utilizing the initial step of an intimate dry mixing procedure of the combination of coarse particles of rapidly water-soluble food acids and the fine particles of a slow water-soluble flavor and flow conditioner wherein on intimate mixing with each other produces a uniformly dispersed composition and the resulting dispersed combination is thoroughly mixed and dispersed with a malto-dextrin having coarse particles, a product is obtained which rapidly dissolves in water providing the desired ready-to-drink beverage. A preferred process of the invention is the addition of a high potency artificial sweetener such as the methyl ester of L-aspartyl-L-phenylalanine (APM) with the malto-dextrin into the first intimately mixed ingredients of food acids, flavors and flow conditioner, and intimately dry mixed until a beverage product is produced which rapidly dissolves in water.

In the production of dry beverage mixes, it has always been important to provide a product which dissolves rapidly and if a clouding agent is present, it is essential that the clouding agent is rapidly and permanently dispersed as well. When sugar is used as a sweetener, the amount of sugar present in the beverage is large enough so that the sugar bulk goes rapidly in solution taking the slowly soluble ingredients such as flavors, clouding agents anti-caking agents and the like into solution. Without sugar present, it has always been a problem to dry mix ingredients which have a slow rate of dissolution including the flavors and especially in combination with the high potency artificial sweeteners such as APM, cyclamates, saccharines and the like to provide a dry beverage mix which on reconstitution rapidly dissolves in water. If the ingredients such as clouding agents, flavors, anti-caking agents and the like in a beverage mix are not rapidly dissolved or easily dispersed, the product is not considered desirable by the consumer.

A further limitation of the high potency artificial sweeteners such as APM is the flowability of the sweeteners when intermixed with other powderous materials. The flowability of the sweeteners in granular mixtures with food acids such as citric acid and other beverage mix ingredients such as flavors and the like, is poor in that it tends to bridge the remaining ingredients such that the mix will not flow readily or discharge through high speed packaging equipment. It has been stated that even when the sweeteners are ground or it is coground with other materials serving as dispersants, the ultimate mix containing such a composition leaves much to be desired in terms of the flowability since the composition tends to pack or bridge.

To overcome the problems of flowability and the slow rate of dissolution and limited solublity of the beverage mixes in aqueous systems, many proposals have been suggested. In U.S. Pat. No. 3,928,633 issued Dec. 23, 1975 and U.S. Pat. No. 4,004,079 issued Jan. 18, 1977, both assigned to General Foods Corporation, APM is discretely dispersed throughout a matrix by melting a fuseable mass and subdividing it to encapsulate the APM therein. The matrix can be a class of amphorous acids such as citric acid; polyhydric alcohols such as sorbitol; starch hydrolyzates such as corn syrup and the like. The encapsulated APM increases its rate of solubility and dry mix flowability. In U.S. Pat. No. 3,761,288 issued Sept. 25, 1973 and U.S. Pat. No. 4,001,456 issued Jan. 4, 1977, both assigned to General Foods Corporation, describe a process for significantly increasing the rate of solution of dipeptide sweetening compounds by codrying or spray-drying an aqueous solution of an edible bulking agent and the dipeptide sweetening compound. U.S. Pat. No. 4,001,448 issued Jan. 4, 1977 assigned to General Foods, describes the steam agglomeration of a dry beverage mix while combining monocalcium - dicalcium phosphate with a food acid such as citric, malic and the like to permit easy flow of materials and avoiding fines of the beverage which have to be recycled. U.S. Pat. No. 4,007,288 issued Feb. 8, 1977 assigned to General Foods Corporation, describes the production of readily soluble sweetening compositions by vacuum drum drying solutions of an edible bulking agent and a dipeptide sweetening agent. All of the above processes which utilize a form of agglomeration of various ingredients provide satisfactory products which are readily water-soluble and readily flowable in their dry form.

SUMMARY OF THE INVENTION

Without agglomerating ingredients as described above, a process has been discovered which provides a rapidly water-soluble free-flowing, substantially sugar-free dry beverage mix. This is achieved in the first step by intimately physically mixing the ingredients of at least one rapid water-soluble acid food having coarse particles with at least one flavor and at least one flow conditioner both having fine particles and both having a slow rate of dissolution in water, for a period of time until a substantially uniform dispersion of all the ingredients is achieved and then in a second step intimately mixing the substantially unform dispersion product of the first step with a malto-dextrin having coarse particles and dextrose equivalency in the range from about 10 to about 20, said mixing continued until the resulting mixed product is rapidly water-soluble. Another aspect of the invention is to incorporate a high potency artificial sweetener such as APM, cyclamates, sacchrines and the like into the second step of mixing with the malto-dextrin to achieve an intimately mixed mixture of all the ingredients used in both step one and two. The resulting product is a rapidly water-soluble, free-flowing dry beverage mix. The term "coarse particles" as used herein means that a 100% of the particles pass through a U.S. screen size of 10 mesh and up to about 95% remains on a U.S. screen size of 100 mesh. The term "finely divided particles" as used herein means that a 100% of the particles passes through a U.S. screen size of 20 mesh and up to about 75 to 100% through the U.S. screen size of 100 mesh and about 40 to 100% through the U.S. screen size of 200 mesh. The term "rapidly water-soluble" as used herein means that the water-soluble materials rapidly dissolve and the clouding agent, if present, readily disperses according to the following test: 10 cubic centimeters of raw material ingredient is added to 150 milliliters of water at 4° C. and hand stirred. If the water-soluble material dissolves without clumping within 5 seconds, the material is considered a rapidly water-soluble ingredient. If clumping or if the water-soluble material does not dissolve in 5 seconds, the term "slow water soluble" as used herein is applied to the ingredient.

DETAILS OF THE INVENTION

A unique process has been discovered to produce a rapidly water-soluble, free-flowing, substantially sugar-free dry beverage mix comprising initially of intimately dry mixing coarse particles of a rapidly water-soluble of at least one food acid with finely divided particles of at least one slow-water soluble flavor and generally at least one flow conditioner. The mixing is continued until a substantially uniform dispersion of the food acid, flavor and flow conditioner is obtained. At this point, the mixture is further intimately dry mixed with a malto-dextrin having coarse particles alone or in combination with APM which is normally finely divided particles or coarse particles to obtain a rapidly water-soluble, free-flowing, substantially sugar-free dry beverage mix. It is essential to utilize at least two separate mixing steps to achieve the appropriate effects. The substantially uniform dispersion of the various ingredients can be visually observed by one skilled in the art. The ultimate test is that the final beverage product is rapidly water-soluble.

The solid edible bulking agents suitable for use in this invention may be any of the non-toxic substances or combination of substances heretofore employed by the prior art for this purpose including the organic food acids such as citric, malic, tartaric, and the like and the hydrolyzed starch materials such as dextrins and sugars. Especially suitable among these solid bulking agents are the dextrins particularly the lower dextrose equivalent (D.E.) dextrins of the class commonly known as corn syrup solids.

The malto-dextrin material used for the production of these dry beverage mixes must dissolve easily in water to produce a clear solution and must be non-hygroscopic. The dextrin material must have a sufficiently low molecular weight to be easily soluble in water and to produce a clear solution so that the final product will have the essential reflecting surfaces in order to give the appearance of a crystalline product. On the other hand, the molecular weight of the dextrin material must be high enough so that hygroscopicity is avoided.

Accordingly, it has been determined that the dextrin material should have a D.E. (Dextrose Equivalent) in the range from about 5 to about 20 and preferably in the range of about 8 to 15. The 9 to 12 D.E. dextrins are particularly preferred where these bulking agents are combined with an organic acid such as citric acid since these dextrins are the most stable when combined with acids. Additionally, it has been found that the best results are obtained if the dextrin material contains little or no monosaccharide (i.e., glucose) and contains an irregular distribution of the other lower (one to eight saccharide units) saccharides with a preponderance of the hexamer and heptamer. Such corn syrup dextrins have been produced by means of enzymatic hydrolysis of starch.

The amount of food acids present in the total beverage mix ranges from about 40 to about 90 weight percent, preferably from about 50 to about 80 weight percent. The amount of malto-dextrin in the total beverage mix ranges from about 0.5 to about 8 weight percent, preferably from about 2 to about 5 weight percent. Both the acid foods and malto-dextrin used in this invention are classified as rapidly water-soluble coarse particles.

The flow conditioners used in this invention are finely divided, slowly water-soluble products. In the manufacture of dry beverage mixes which have flavor, coloring and artificial sweeteners, these mixes will be packaged under moderately controlled, low-relative humidity, ambient room temperature conditions whereby the mix as packaged will be free-flowing and respond to variations in the flow properties thereof without undue changes in the physical properties. In the manufacture of acid-based beverage products, it is useful to add flow conditioners such as magnesium oxide, tricalcium phosphate, monocalcium phosphate, dicalcium phosphate food grade silicon dioxide, sodium silicate and the like. These flow conditioners can be used in amounts from about 0.05% to about 5% by weight of the total mix. In a beverage mix, color is extremely important. A coloring agent can be added to the mix. Another technique is to color plate the flow conditioners such as described in U.S. Pat. No. 4,002,770 issued Jan. 11, 1977 and assigned to General Foods Corporation. The technique of color plating is accomplished by separately coating phosphates especially tricalcium phosphate by dispersion in a solution or slurry of water-soluble solutes which is thereafter dried to a desired reduced moisture content of, say below 0.75%, depending upon the level of such coloring agent that is employed, the flowability and clumping problems are greatly eliminated. The need to rely upon a coloring solution such as an adjunct to edify the beverage mix can be substantially reduced or eliminated. The amount of color present will depend on the hue desired in the final product. The colored flow conditioner can be present in the beverage mix in amounts from about 0.05 to about 8% by weight of the total beverage mix, preferably from about 1 to about 5 weight percent of the total beverage mix.

The flavors which are used in the preparation of the beverage mix of this invention include natural and artificial flavors. The natural food flavors include tangerine, grapefruit, grape, lemon, lime, orange among others. The flavors used herein are generally slow water-soluble ingredients and are finely divided particles. The slow water-solubility of these ingredients create appearance problems in the final beverage mix but by the process of this invention, these problems are overcome. The amounts of flavor or flavors in the final beverage mix can be present over a wide range depending on the resulting flavor desired. The amounts of flavors present range from about 1 to about 50 weight percent, preferably about 5 to about 15 weight percent of the total beverage mix.

In the production of a beverage mix wherein it is desired to have a clouding or dispersing agent added to give the final mix a natural fruit drink appearance, the clouding agent such as food grade titanium dioxide, titanium dioxide—food starch or gum blends or oil based clouding agents and are mixed with food acid(s), flow conditioner(s) and slow-water soluble flavor(s) in the first mixing step of the process of this invention. It is essential that the clouding agent in the final beverage mix readily disperses on the addition of water while the rapidly water-soluble ingredients are going into solution. It has been found that a polysaccharide gum such as xanthan gum may not permit the clouding agent to disperse readily. In this process, if pectin is combined with a clouding agent such as titanium dioxide and a malto-dextrin, the dispersion of the clouding agent readily occurs in the aqueous beverage solution. Other gums which may be satisfactory include carrageenan, guar gum, agar-agar, sodium alignate and the like. Thus, using the process of this invention, the careful selection of clouding agents are essential to achieve the desired result. The amount of clouding agent present in the dry beverage mix range from 0.01 to about 15 weight percent, preferably from about 0.1 to about 10 weight percent depending on turbidity desired and type of clouding agent.

The process of this invention provides a rapidly water-soluble, free-flowing, substantially sugar-free dry beverage mix which can be sweetened after the ready-to-drink beverage is prepared or can contain high potency artificial sweetener such as saccharine, cyclamate, APM and the like. The amount of artificial sweetener present in the beverage can vary over a wide range depending on the level of sweetness desired. These amounts can range from about 0.01 to about 10 weight percent of the total beverage mix, preferably about 1 to about 6 weight percent of the total beverage mix.

In the beverage mixes made by this process of the invention, it is desired but not essential to add buffers such as potassium citrate, trisodium citrate, monocalcium phosphate, and the like that the ready-to-drink beverage will maintain the desired pH range of the drink. Preferred buffers are those which are rapidly water-soluble, having coarse particles and will not interfere with the taste or flavors. These are known to those skilled in the art. The most preferred buffer for this process is potassium citrate. The amount of buffers present in the total beverage mix ranges from about 0.5 to about 15 weight percent, preferably from about 1 to about 8 weight percent of the total beverage mix.

The type of mixes used in the mixing of the coarse and fine particle ingredients can be any mixes which will provide a substantially uniformly dispersed dry product. These mixers can include a Ribbon Blender, Hobart Blender, Paddle Blender, V-Blender, Twin Cone, and the like. The preferred blender is a Ribbon Blender.

The processes of this invention are futher illustrated but not limited by the following examples:

EXAMPLE 1

The following ingredients were placed in a 4.5 quart stainless steel bowl:
Citric Acid (coarse particles): 174.8 grams
Potassium Citrate (coarse particles): 3.96 grams
Natural Lemon Flavor (fine particles): 19.02 grams
Tricalcium Phosphate (fine particles): 8.36 grams
Natural Lime Flavor (fine particles): 3.18 grams
Tartrazine and Blue Coloring (fine particles): 0.023 grams The above ingredients were mixed on a Kitchen Aid food preparer with a flat beater at speed setting 2 for 5 minutes. Then 8.88 grams agglomerated corn dextrin (D.E.-9 to 12) and 11.98 grams finely divided APM were added to the bowl and all ingredients mixed for additional 10 minutes. The resulting dry mixed beverage mix was uniformly dispersed. When prepared by adding 1500 cc of water to 11.6 grams of mix, the mix dissolved rapidly in less than 5 seconds with virtually no stirring. Add the mix to water, the mix dissolved quickly. The agglomerated product of the prior art did not dissolve quickly and required additional stirring (more than the mixture above) to dissolve the beverage mix. Mixing all the ingredients together in one mix did not provide the rapidly water-soluble beverage mix. It should be noted that the initial mixing step requires that a uniform dispersement of the product is necessary prior to the addition of the APM and agglomerated corn dextrin. Additionally, premixing the APM and the agglomerated corn dextrin, then mixing this premix to the mix in the first step, will not provide a rapidly water-soluble beverage mix.

EXAMPLE 2

The following ingredients to prepare an orange beverage mix were placed in a Ribbon Blender:
Citric Acid (coarse particles): 53.9 lbs.
Tricalcium Phosphate (fine particles): 8.27 lbs.
*Titanium Dioxide Cloud (fine particles): 2.88 lbs.
Orange Flavor (fine particles): 17.96 lbs.
Potassium Citrate Monohydrate (coarse particles): 6.37 lbs.
Tartrazine (yellow-orange) Acid and Yellow Coloring (fine particles): 0.35 lbs.
*Spray-dried blend of 15 D.E. corn dextrin, pectin and food grade titanium dioxide (fine particles) at 25% maximum solids.

The above ingredients were blended for 5 minutes to obtain a uniformly dispersed dry product. Then 8.68 lbs agglomerated (coarse particles) corn dextrin (D.E. 9 to 12) and 4.54 lbs of APM (fine particles) were blended for 10 minutes into the blended ingredients in the first mix. The resulting product was rapidly water-soluble and the titanium dixoide dispersed readily providing a permanent cloud effect.

EXAMPLE 3

The following ingredients to prepare a citrus blend beverage mix were placed in a Ribbon Blender:
Citric Acid (coarse particles): 54.0 lbs.
*Titanium Dioxide Cloud (fine particles): 5.9 lbs.
Citrus Blend Flavor (fine particles): 9.6 lbs.
Potassium Citrate Monohydrate (coarse particles): 7.5 lbs.
Tangerine Flavor (fine particles): 3.8 lbs.
Tricalcium Phosphate and Orange Color (fine particles): 3.7 lbs.
Tricalcium Phosphate (fine particles): 2.19 lbs.
Grapefruit Flavor (fine particles): 0.43 lbs.
Sunset Yellow Coloring: 0.006 lbs.
*Spray-dried blend of 15 D.E. corn dextrin, pectin and food acid titanium dioxide (fine particles) at 25% maximum solids.

The above ingredients were blended for 5 minutes to obtain a uniformly dispersed dry product. Then 8.68 lbs. agglomerated (coarse particles) corn dextrin D.E. (9 to 12) and 4.54 lbs APM (fine particles) were blended for 10 minutes into the blended ingredients in the first mix. The resulting product was rapidly water-soluble and the titanium dioxide dispersed readily providing a permanent cloud effect.

What is claimed is:

1. A process for preparing a rapidly water-soluble, free-flowing, substantially sugar-free dry beverage mix comprising the ingredients of at least one food acid, at least one flavor and at least one flow conditioner, the steps comprising a first intimate dry mixing of the coarse particles of at least one rapid water-soluble food acid with the finely divided particles of at least one slow water-soluble flow conditioner to obtain a substantially uniform dispersion of said rapidly water-soluble food acid and said slow water-soluble flavor and conditioner and a second intimately dry mixing of the said uniform dispersion composition of the first mixing step with a maltodextrin having coarse particles and a dextrose equivalency in the range from about 5 to about 20, said mixing continued until the resulting product is water-soluble, said coarse particles being of a size wherein 100% pass through a U.S. screen size of 10 mesh and up to about 95% remains on a U.S. screen size of 100 mesh and said finely divided particles being of a size wherein 100% pass through a U.S. screen size of 20 mesh and up to about 75 to 100% through a U.S. screen size of 100 mesh and about 40 to 100% through a U.S. screen size of 200 mesh.

2. The process of claim 1 wherein a high potency artificial sweetener is intimately mixed in the second mixing step with the coarse particles of malto-dextrin obtaining a uniformly dispersed physical mixture of all ingredients present.

3. The process of claim 2 wherein the high potency artificial sweetener is the methyl ester of L-aspartyl-L-phenylalanine.

4. The process of claim 1 wherein the fine particles of the slow water-soluble natural fruit flavors are selected from the group consisting of tangerine, grapefruit, grape, lemon, lime and orange.

5. The process of claim 1 wherein the coarse particles of rapidly water-soluble food acids are selected from the group consisting of citric acid, tartaric acid and malic acid.

6. The process of claim 1 wherein the flow conditioner is selected from the group consisting of tricalcium phosphate, monocalcium phosphate, dicalcium phosphate, magnesium oxide, silicon dioxide and sodium silicate.

7. The process of claim 1 wherein a coloring is added to the ingredients to provide the desired coloring effect.

8. The process of claim 2 wherein the fine particles of the slow water-soluble natural food flavors are selected from the group consisting of tangerine, grapefruit, grape, lemon, lime and orange.

9. The process of claim 2 wherein the coarse particles of the rapidly water-soluble food acids are selected from the group consisting of citric acid, tartaric acid and malic acid.

10. The process of claim 2 wherein the flow conditioner is selected from the group consisting of tricalcium phosphate, monocalcium phosphate, dicalcium phosphate, magnesium oxide, silicon dioxide and sodium silicate.

11. The process of claim 2 wherein the ingredients comprise:
1. a combination of rapidly water-soluble food acids of citric, malic and tartaric acid;
2. a slow water-soluble grape flavor;
3. potassium citrate as a buffer;
4. the methyl ester of L-aspartyl-L-phenylalanine as a sweetener;
5. coarse particles of corn dextrin having a dextrose equivalent from about 9 to about 12 and;
6. magnesium oxide as a flow conditioner.

12. The process of claim 2 wherein the ingredients comprise:
1. citric acid;
2. a combination of a citrus blend of tangerine and grapefruit flavors;
3. potassium citrate;
4. the methyl ester of L-aspartyl-L-phenylalanine;
5. coarse particles of corn dextrin having a dextrose equivalent from about 9 to 12 and;
6. a combination of yellow color plated tricalcium phosphate and tricalcium phosphate flow conditioners.

13. The process of claim 2 wherein the ingredients comprise:
1. citric acid;
2. postassium citrate;
3. tricalcium phosphate;
4. the methyl ester of L-aspartyl-L-phenylalanine;
5. corn dextrin having coarse particles and a dextrose equivalent of about 9 to about 12 and;
6. a lemon flavor.

14. The process of claim 13 wherein lime is added as an additional flavor.

15. The process of claim 2 wherein the ingredients comprise:
1. citric acid;
2. tricalcium phosphate;
3. titanium dioxide as a clouding material;
4. orange flavor;
5. potassium citrate;
6. the methyl ester of L-asparty-L-phenylalanine and;
7. coarse particles of corn dextrin having a dextrose equivalent from about 9 to about 12.

* * * * *